(12) United States Patent
Wang

(10) Patent No.: US 8,978,051 B2
(45) Date of Patent: Mar. 10, 2015

(54) METHOD AND APPARATUS FOR DISPLAYING APPLICATION IMAGE

(75) Inventor: Yonghui Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 368 days.

(21) Appl. No.: 13/504,404

(22) PCT Filed: Oct. 20, 2010

(86) PCT No.: PCT/CN2010/077902
§ 371 (c)(1),
(2), (4) Date: May 18, 2012

(87) PCT Pub. No.: WO2011/050683
PCT Pub. Date: May 5, 2011

(65) Prior Publication Data
US 2012/0236012 A1     Sep. 20, 2012

(30) Foreign Application Priority Data

Oct. 28, 2009   (CN) .......................... 2009 1 0236697

(51) Int. Cl.
*G06F 3/00* (2006.01)
*G06F 9/44* (2006.01)

(52) U.S. Cl.
CPC .................................. *G06F 9/4443* (2013.01)
USPC ............................ 719/321; 719/328; 719/319

(58) Field of Classification Search
CPC ....... G06F 9/4443; G06F 3/1454; G06F 3/14; G06F 21/53; G06F 3/1431; G06F 9/45533; G06F 9/4445
See application file for complete search history.

(56) References Cited

U.S. PATENT DOCUMENTS

| 6,892,359 B1* | 5/2005 | Nason et al. ................... 715/788 |
| 2002/0184409 A1* | 12/2002 | Broussard ...................... 709/328 |
| 2005/0210158 A1* | 9/2005 | Cowperthwaite et al. ........ 710/1 |
| 2005/0262500 A1 | 11/2005 | Stanley |
| 2007/0296718 A1* | 12/2007 | Tzruya et al. ................. 345/418 |
| 2008/0211820 A1* | 9/2008 | Aoki ............................. 345/522 |

FOREIGN PATENT DOCUMENTS

| CN | 1519700 A | 8/2004 |
| CN | 1609791 A | 4/2005 |

OTHER PUBLICATIONS

International Search Report cited in PCT/CN2010/077902, dated Jan. 27, 2011.

* cited by examiner

*Primary Examiner* — Tuan Dao
(74) *Attorney, Agent, or Firm* — Workman Nydegger

(57) ABSTRACT

A method and a device for displaying an application image are provided, and the method includes the following steps: receiving a display request from a second operating system, and reading the application image stored in a storage area; judging whether it is required to process the application image through a window manager according to the configuration of the local image display system, and if required, sending the application image to the window manager, and sending the application image processed by the window manager to a display graphics library for processing; if not, directly sending the application image to the display graphics library for processing; and acquiring the location of the display memory through a display driver, sending the application image processed by the display graphics library to the display memory, and displaying the application image through the display memory. Using the solution, the application image of the installable operating system can be displayed in the local operating system.

7 Claims, 5 Drawing Sheets

METHOD AND APPARATUS FOR DISPLAYING APPLICATION IMAGE

The present application is a US National Stage of International Application No. PCT/CN2010/077902, filed 20 Oct. 2010, designating the United States, and claiming priority to Chinese Patent Application No. 200910236697.1 filed 28 Oct. 2009. Both of the aforementioned applications are incorporated herein in their entireties by this reference.

FIELD OF THE INVENTION

The present invention relates to the field of communications and particularly to a method and apparatus for displaying an application image.

BACKGROUND OF THE INVENTION

A smart mobile phone operating system has become an application host environment requisite for predominant mobile phones along with constant development of mobile communication devices and operating systems. Also various manufacturers of smart mobile phone operating systems have been involved in intensive competition in this field, but the different smart mobile phone operating systems have their own advantages and fail to satisfy a variety of demands of mobile phone users.

In order to alleviate the drawbacks of the various smart mobile phone operating systems and integrate the advantages of the various smart mobile phone operating systems, a virtualization technology similar to a virtual machine has been proposed in the prior art to integrate the different smart mobile phone operating systems in the same mobile phone. This virtualization technology includes a hardware virtualization technology and an Application Programming Interface (API) compatible layer virtualization technology. Particularly the hardware virtualization technology is used to virtualize hardware devices including a plurality of Central Processing Units (CPUs) and a plurality of memories on an operating system and to install another integral operating system on the hardware device so that the user can treat the original operating system and the newly installed operating system as two separate and totally different operating systems; and the API compatible virtualization technology is used to simulate on an operating system a runtime environment of another operating system so that an application is run directly in the simulated runtime environment.

The inventors have identified during making of the invention at least the following drawbacks in the prior art.

In the hardware virtualization technology, the different operating systems are integrated with the dependence upon the virtual device virtualized by a virtual machine, and the original operating system and the newly installed operating system appear to the user as two totally separate operating systems, so there is no uniform experience of the user; and in the API compatible virtualization technology, the different operating systems are integrated with the dependence upon an X server, but an embedded operating system of a smart mobile phone typically is not designed based upon a display architecture of the X server in an Linux environment and consequently can not be correspondingly integrated so far.

SUMMARY OF THE INVENTION

Embodiments of the invention provide a method and apparatus for displaying an application image, which can display an application image of an installable operating system in a local operating system.

An embodiment of the invention provides a method for displaying an application image, which is applicable in a device including a first operating system and a second operating system with the first operating system including a memory including a storage area assigned to the application of the second operating system and which includes:

receiving a display request from the second operating system and reading the application image stored in the storage area;

judging whether a window manager is needed to process the application image according to the configuration of a local image display system, and if the window manager is needed, transmitting the application image to the window manager and transmitting the application image processed by the window manager to a display graphic library for processing; otherwise, transmitting the application image directly to the display graphic library for processing; and acquiring the location of a frame buffer through a display driver, transmitting the application image processed by the display graphic library to the frame buffer, and displaying the application image through the frame buffer.

Preferably, the method further includes: before receiving the display request from the second operating system, performing read and write operations, by the second operating system, in the storage area and transmitting the display request at the end of the operations to request a display process on the application image stored in the storage area.

Preferably, performing the read and write operations by the second operating system in the storage area includes:

receiving, by the second operating system, a User Interface, UI, update request from the application of the second operating system; and processing, by the second operating system, the application image in response to the received UI update request.

Preferably, transmitting by the second operating system the display request at the end of the operations includes:

transmitting, by the second operating system, the display request in inter-process communication to request to perform UI update and display on the application image stored in the storage area.

Preferably, the method further includes: after displaying the application image through the frame buffer, returning a display success message to the second operating system to have the second operating system perform display operations on the next frame.

An embodiment of the invention provides an apparatus for displaying an application image, which is applicable in a device including a first operating system and a second operating system with the first operating system including a memory including a storage area assigned to the application of the second operating system and which includes:

a proxy module configured to receive a display request from the second operating system, read the application image stored in the storage area, and judge whether a window manager is needed to process the application image according to the configuration of a local image display system, and if the window manager is needed, transmit the application image to the window manager and transmit the application image processed by the window manager to a graphic processing module; otherwise, transmit the application image directly to the graphic processing module;

the graphic processing module configured to receive the application image from the proxy module and process the application image;

a display driver module configured to acquire the location of a frame buffer module and transmit the application image processed by the graphic processing module to the frame buffer module; and the frame buffer module configured to receive the application image from the display driver module and display the application image.

Preferably, the proxy module is further configured to assign the storage area to the application of the second operating system in the memory of the first operating system after the application is run.

Preferably, the apparatus further includes:

a running module configured to perform read and write operations in the storage area and transmit the display request to the proxy module at the end of the operations to request the proxy module for a display process on the application image stored in the storage area.

Preferably, the running module is further configured to receive a UI update request from the application of the second operating system, process the application image in response to the received UI update request and instruct the proxy module in inter-process communication to perform UI update and display on the application image stored in the storage area.

Preferably, the proxy module is further configured to return a display success message to the running module to have the second operating system perform display operations on the next frame.

The embodiments of the invention have the following advantages over the prior art: an application image of an installable operating system can be displayed locally through sharing a memory between different operating systems, thereby attaining the effect of seamless integration of a local operating system with the installable operating system, and a display effect of the application image is totally independent of the type of a locally used graphic system, so that a display function of the local graphic system can be used seamlessly, thus enabling the local operating system and the installable operating system to use the same display device concurrently. Furthermore, the installable operating system and the local operating system can interact in inter-process communication, thereby avoiding the problem of copyright infection arising between the installable operating system and the local operating system and making the local operating system totally separate in copyright from the installable operating system.

BRIEF DESCRIPTION OF THE DRAWINGS

In order to describe more clearly the technical solutions in the embodiments of the invention or in the prior art, the drawings to be used in the description of the embodiments of the invention or the prior art will be briefly introduced below, and apparently the drawings in the following description illustrate only some of embodiments of the invention, and other drawings can also occur to those ordinarily skilled in the art benefiting from these drawings but without any inventive effort.

DETAILED DESCRIPTION OF THE EMBODIMENTS

In a technical solution according to an embodiment of the invention, a proxy module providing a second operating system with a proxy function is used in a first operating system, and the proxy module inherits all the features of applications of the first operating system and can perform all the communication functions with the second operating system and acquire an application image processed in a runtime environment of the second operating system through sharing a memory, having the application image processed and displayed by the first operating system, so that the application of the second operating system has both the features of its own system and the features of an application of the first operating system, thereby attaining the effect of seamless integration of the first operating system with the second operating system. It shall be noted that the first operating system and the second operating system are integrated seamlessly on the precondition that both the systems can use the same display device without any difference.

The technical solutions according to the embodiments of the invention will be described clearly and fully below with reference to the drawings in the embodiments of the invention, and apparently the described embodiments are only a part but not all of embodiments of the invention. Any other embodiments which can occur to those ordinarily skilled in the art benefiting from the described embodiments of the invention but without any inventive effort shall come into the claimed scope of the invention.

Figure 1:
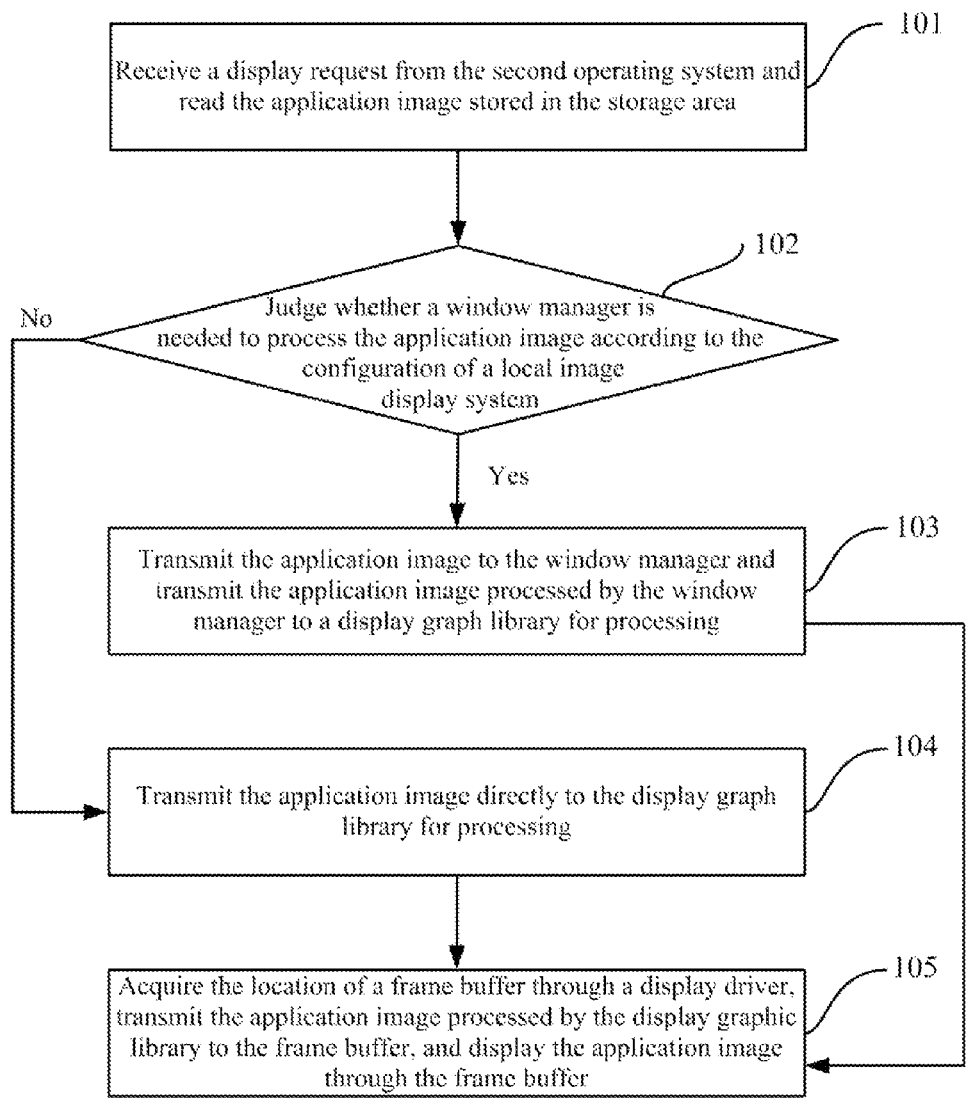
FIG. 1 is a flow chart of a method for displaying an application image according to an embodiment of the invention.

Reference is made to FIG. 1 illustrating a flow chart of a method for displaying an application image according to an embodiment of the invention, which is applicable in a device including a first operating system and a second operating system with the first operating system including a memory including a storage area assigned to an application of the second operating system and which includes the following steps.

The step 101 is to receive a display request from the second operating system and to read an application image stored in the storage area.

The first operating system can be a local operating system in the device, and the second operating system can be an installable operating system in the device. A runtime environment of the second operating system resides at an API compatible layer and includes an image display processing portion for image processing and forwarding image data of a User Interface (UI) to a hardware display area. The first operating system can acquire the application image processed in the runtime environment of the second operating system through sharing a memory with the second operating system.

Specifically, the application of the second operating system is run, and a proxy module of the first operating system corresponding to the application assigns the storage area for the application in the memory of the first operating system. The runtime environment of the second operating system can perform read and write operations in the storage area and transmit a display request at the end of the operations to request a display process on the application image stored in the storage area.

The step 102 is to judge whether a window manager is needed to process the application image according to the configuration of a local image display system, and if so, the flow goes to the step 103; otherwise, the flow goes to the step 104.

The window manager is a library required for a system application, i.e., a module in the first operating system responsible for window management, and since a UI of the application is managed in a window, any display will be output onto a display device in a window, and an image to be displayed for either an application of the second operating system or an application of the first operating system will be placed into the window manager for display.

The step 103 is to transmit the application image to the window manager and to transmit the application image processed by the window manager to a display graph library for processing.

The step 104 is to transmit the application image directly to the display graph library for processing.

The display graph library is an intervening layer, i.e., a hardware driver abstraction layer, for interaction of an operating system kernel with an upper layer, and when image acceleration is required in the system, the display graph library performs image display by using a similar hardware acceleration module to display a UI, including painting and 3D processing, and displays it to the hardware device directly through the graphic acceleration module.

The step 105 is to acquire the location of a frame buffer through a display driver, to transmit the application image processed by the display graphic library to the frame buffer, and to display the application image through the frame buffer.

The display driver is a core module of the operating system to perform system hardware management, system scheduling, memory management and hardware interruption handling, e.g., loading and configuring a graphic card, so that the system can identify the display device and a system application can transmit display contents to the hardware frame buffer through the display driver; and the frame buffer is an essential hardware of the operating system to receive data of a display screen to be output and to display the received data.

In the embodiment of the invention, an application image of an installable operating system can be displayed locally through sharing a memory between different operating systems, thereby attaining the effect of seamless integration of a local operating system with the installable operating system, and a display effect of the application image is totally independent of the type of a locally used graphic system, so that a display function of the local graphic system can be used seamlessly, thus enabling the local operating system and the installable operating system to use the same display device concurrently. Furthermore, the installable operating system and the local operating system can interact in inter-process communication, thereby avoiding the problem of copyright infection arising between the installable operating system and the local operating system and making the local operating system totally separate in copyright from the installable operating system.

Figure 2:
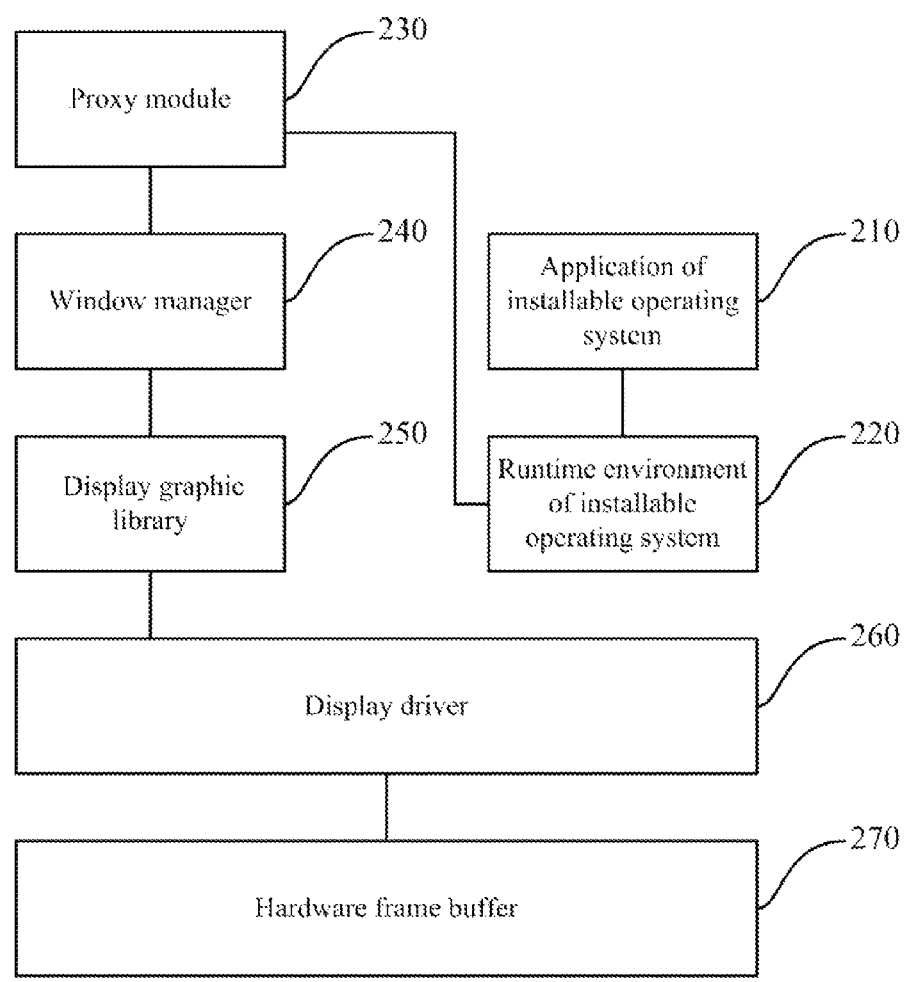
FIG. 2 illustrates a schematic diagram of an architecture in which an application image is displayed in an application scenario according to an embodiment of the invention.

Reference is made to FIG. 2 illustrating a schematic diagram of an architecture in which an application image is displayed in an application scenario according to an embodiment of the invention, which includes an application of an installable operating system (Installable OS Application) 210, a runtime environment of the installable operating system (Installable OS runtime) 220, a proxy module (Proxy) 230, a window manager 240, a display graphic library (Open GL) 250, a display driver 260 and a hardware frame buffer 270.

The runtime environment of the installable operating system 220 resides at an API compatible layer and includes an image display processing portion for image processing and forwarding image data of a UI to a hardware display area; the proxy module 230 is a module interfacing the runtime environment of the installable operating system with an image of a local operating system, and it communicates with the runtime environment of the installable operating system through sharing a memory and in inter-process communication and transmits a UI for display in the runtime environment of the installable operating system to a local graphic display system for processing, so that the local graphic system and the runtime environment of the installable operating system share the same display device concurrently and an application of the installable operating system is integrated seamlessly with the local operating system; the window manager 240 is a library required for a system application, i.e., a module in the local operating system responsible for window management, and since a UI of the application is managed in a window, any display will be output onto the display device in a window, and an image to be displayed for either an application of the installable operating system or an application of the local operating system will be placed into the window manager for display; the display graphic library 250 is an intervening layer, i.e., a hardware driver abstraction layer, for interaction of an operating system kernel with an upper layer, and when image acceleration is required in the system, the display graphic library performs image display in a similar hardware acceleration module to display a UI, including painting and 3D processing, and displays it to the hardware device directly through the graphic acceleration module; the display driver 260 is a core module of the operating system to perform system hardware management, system scheduling, memory management and hardware interruption handling, e.g., loading and configuring a graphic card, so that the system can identify the display device and a system application can transmit display contents to the hardware frame buffer through the display driver; and the hardware frame buffer 270 is an essential hardware of the operating system to receive data of a display screen to be output and to display the received data.

The method for displaying an application image according to an embodiment of the invention will be described in details below in connection with the foregoing application scenario.

Figure 3:
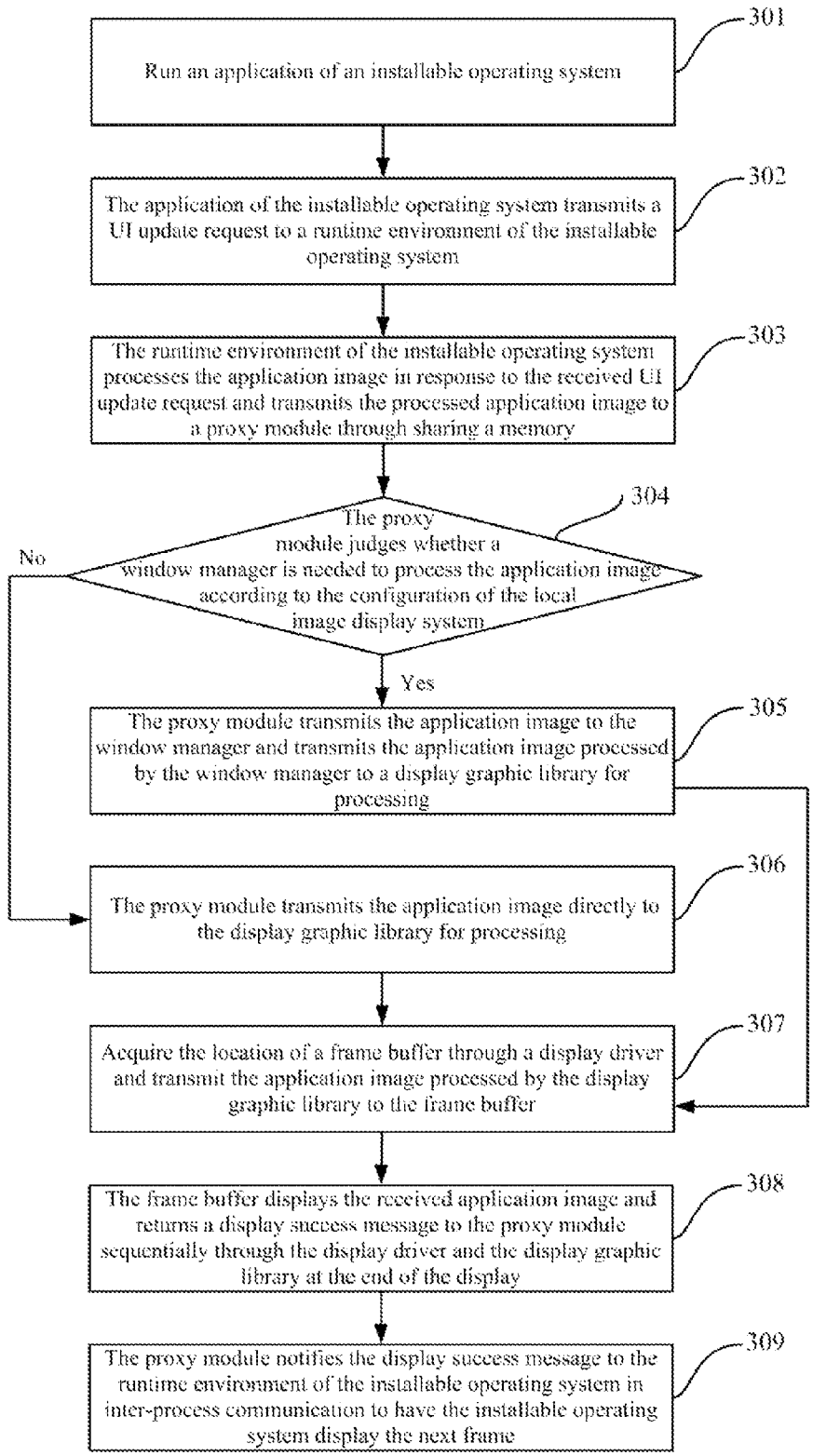
FIG. 3 is a flow chart of a method for displaying an application image in the application scenario according to an embodiment of the invention.

Reference is made to FIG. 3 illustrating a flow chart of the method for displaying an application image in the application scenario according to an embodiment of the invention, which includes the following steps.

The step 301 is to run an application of an installable operating system.

In the step 302, the application of the installable operating system transmits a UI update request to a runtime environment of the installable operating system.

In the step 303, the runtime environment of the installable operating system processes an application image in response to the received UI update request and transmits the processed application image to a proxy module through sharing a memory.

Specifically, the application of the installable operating system is run, and the proxy module of the local operating system corresponding to the application assigns a storage area for the application in the memory of the local operating system. The runtime environment of the installable operating system can perform read and write operations in the storage area and transmit a display request to the proxy module in inter-process communication at the end of the operations to request the proxy module for UI update and display on the application image stored in the storage area.

The proxy module is a module interfacing the runtime environment of the installable operating system with an image of the local operating system, and it communicates with the runtime environment of the installable operating system through sharing the memory and in inter-process communication and transmits a UI for display in the runtime environment of the installable operating system to a local graphic display system for processing, so that the local graphic system and the runtime environment of the installable operating system share the same display device concurrently and the application of the installable operating system is integrated seamlessly with the local operating system.

In the step 304, the proxy module judges whether a window manager is needed to process the application image according to the configuration of the local image display system, and if so, it performs the step 305; otherwise, it performs the step 306.

In the step 305, the proxy module transmits the application image to the window manager and transmits the application image processed by the window manager to a display graphic library for processing.

In the step 306, the proxy module transmits the application image directly to the display graphic library for processing.

The step 307 is to acquire the location of a frame buffer through a display driver and to transmit the application image processed by the display graphic library to the frame buffer.

In the step 308, the frame buffer displays the received application image and returns a display success message to the proxy module sequentially through the display driver and the display graphic library at the end of the display.

In the step 309, the proxy module notifies the display success message to the runtime environment of the installable operating system in inter-process communication to have the installable operating system perform display operations on the next frame.

In the embodiment of the invention, an application image of an installable operating system can be displayed locally through sharing a memory between different operating systems, thereby attaining the effect of seamless integration of a local operating system with the installable operating system, and a display effect of the application image is totally independent of the type of a locally used graphic system, so that a display function of the local graphic system can be used seamlessly, thus enabling the local operating system and the installable operating system to use the same display device concurrently. Furthermore, the installable operating system and the local operating system can interact in inter-process communication, thereby avoiding the problem of copyright infection arising between the installable operating system and the local operating system and making the local operating system totally separate in copyright from the installable operating system.

The method for displaying an application image and the application scenario thereof according to the embodiments of the invention have been presented in the foregoing implementations, and correspondingly an embodiment of the invention further provides an apparatus in which the foregoing method for displaying an application image is applied.

Figure 4:
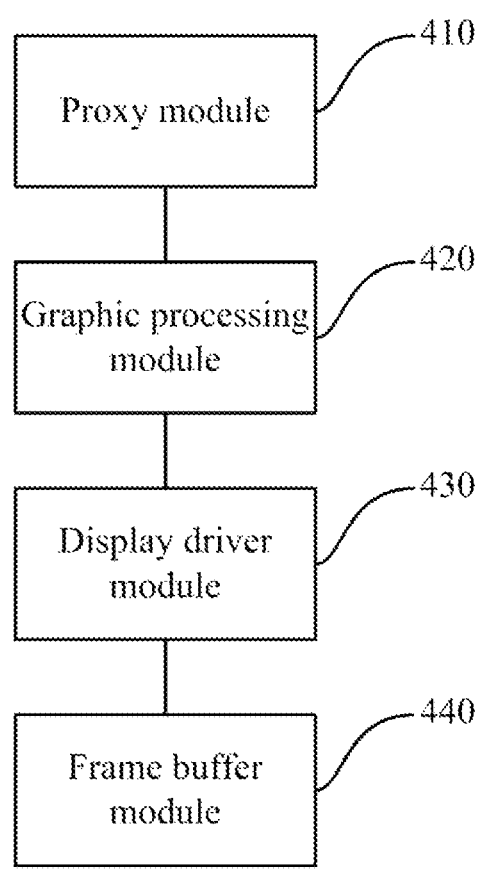
FIG. 4 is a structural diagram of an apparatus for displaying an application image according to an embodiment of the invention.

Reference is made to FIG. 4 illustrating a structural diagram of an apparatus for displaying an application image according to an embodiment of the invention, which is applicable in a device including a first operating system and a second operating system with the first operating system including a memory including a storage area assigned to an application of the second operating system and which includes a proxy module 410, a graphic processing module 420, a display driver module 430 and a frame buffer module 440.

The proxy module 410 is configured to receive a display request from the second operating system, read the application image stored in the storage area, and judge whether a window manager is needed to process the application image according to the configuration of a local image display system, and if so, transmit the application image to the window manager and transmit the application image processed by the window manager to the graphic processing module; otherwise, transmit the application image directly to the graphic processing module 420.

Specifically, the proxy module 410 is a module interfacing a runtime environment of the second operating system with an image of the first operating system, and it communicates with the runtime environment of the second operating system through sharing a memory and in inter-process communication and transmits a UI for display in the runtime environment of the second operating system to a local graphic display system for processing, so that the local graphic system and the runtime environment of the second operating system share the same display device concurrently and the application of the second operating system is integrated seamlessly with the first operating system.

The graphic processing module 420 is configured to receive the application image from the proxy module 410 and process the application image.

The display driver module 430 is configured to acquire the location of the frame buffer module 440 and transmit the application image processed by the graphic processing module 420 to the frame buffer module 440.

Specifically, the display driver module 430 is a core module of the operating system to perform system hardware management, system scheduling, memory management and hardware interruption handling, e.g., loading and configuring a graphic card, so that the system can identify the display device and a system application can transmit display contents to the hardware frame buffer through the display driver.

The frame buffer module 440 is configured to receive the application image from the display driver module 430 and display the application image.

Specifically, the frame buffer module 440 is an essential hardware of the operating system to receive data of a display screen to be output and display the received data.

In the embodiment of the invention, an application image of an installable operating system can be displayed locally through sharing a memory between different operating systems, thereby attaining the effect of seamless integration of a local operating system with the installable operating system, and a display effect of the application image is totally independent of the type of a locally used graphic system, so that a display function of the local graphic system can be used seamlessly, thus enabling the local operating system and the installable operating system to use the same display device concurrently. Furthermore, the installable operating system and the local operating system can interact in inter-process communication, thereby avoiding the problem of copyright infection arising between the installable operating system and the local operating system and making the local operating system totally separate in copyright from the installable operating system.

Figure 5:
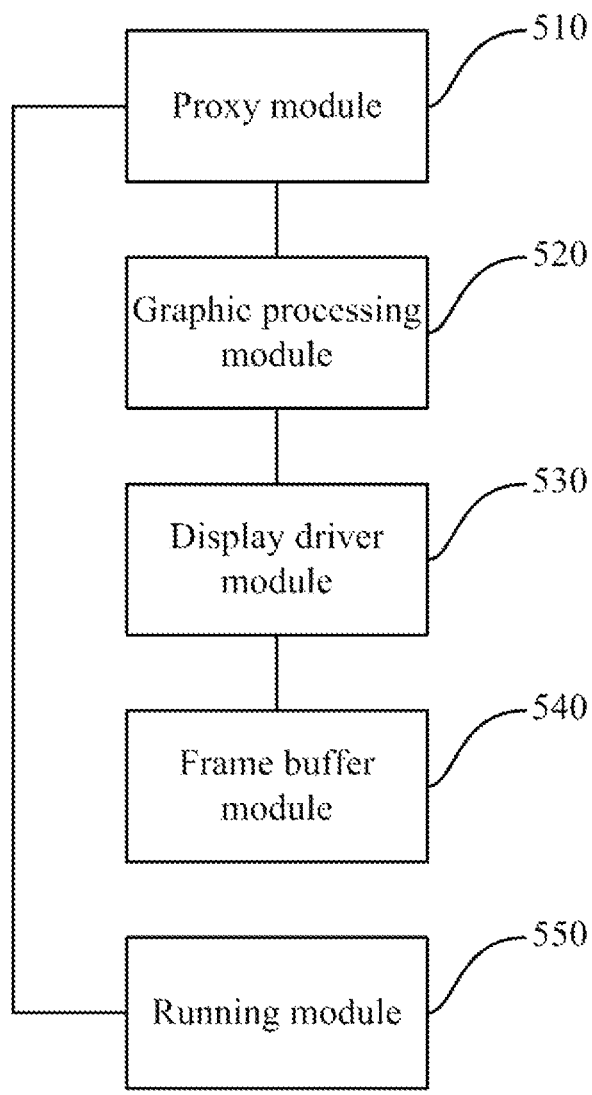
FIG. 5 is a structural diagram of an apparatus for displaying an application image in the application scenario according to an embodiment of the invention.

Reference is made to FIG. 5 illustrating a structural diagram of the apparatus for displaying an application image in the application scenario according to an embodiment of the invention, which includes a proxy module 510, a graphic processing module 520, a display driver module 530, a frame buffer module 540 and a running module 550.

The proxy module 510 is configured to receive a display request from a second operating system, read the application image stored in a storage area, and judge whether a window manager is needed to process the application image according to the configuration of a local image display system, and if so, transmit the application image to the window manager and transmit the application image processed by the window manager to the graphic processing module; otherwise, transmit the application image directly to the graphic processing module 520.

The proxy module 510 is further configured to assign the storage area to the application of the second operating system in a memory of a first operating system after the application is run.

Specifically, the running module 550 runs the application of the second operating system, and the proxy module 510 corresponding to the application assigns the storage area for the application in the memory of the first operating system. The running module 550 can perform read and write operations in the storage area and instruct the proxy module 510 at the end of the operations to perform a display process on the application image stored in the storage area.

The proxy module 510 is further configured to return a display success message to the running module 550 to have the second operating system perform display operations on the next frame.

Specifically, after the frame buffer module 540 displays the received application image, the proxy module 510 returns the display success message to the running module 550 to have the second operating system display the next frame and further acquires an application image processed in the runtime environment of the second operating system.

The graphic processing module 520 is configured to receive the application image from the proxy module 510 and process the application image.

The display driver module 530 is configured to acquire the location of the frame buffer module 540 and transmit the application image processed by the graphic processing module 520 to the frame buffer module 540.

The frame buffer module 540 is configured to receive the application image from the display driver module 530 and display the application image.

The running module 550 is configured to perform read and write operations in the storage area and transmit the display request to the proxy module 510 at the end of the operations to request the proxy module 510 to display the application image stored in the storage area.

The running module 550 is configured to receive a UI update request from the application of the second operating system, process the application image in response to the received UI update request and instruct the proxy module 510 in inter-process communication to perform UI update and display on the application image stored in the storage area.

In the embodiment of the invention, an application image of an installable operating system can be displayed locally through sharing a memory between different operating systems, thereby attaining the effect of seamless integration of a local operating system with the installable operating system, and a display effect of the application image is totally independent of the type of a locally used graphic system, so that a display function of the local graphic system can be used seamlessly, thus enabling the local operating system and the installable operating system to use the same display device concurrently. Furthermore, the installable operating system and the local operating system can interact in inter-process communication, thereby avoiding the problem of copyright infection arising between the installable operating system and the local operating system and making the local operating system totally separate in copyright from the installable operating system.

Those skilled in the art can clearly appreciate from the foregoing description of the embodiments that the invention can be implemented in software plus a requisite general hardware platform or, of course, possibly in hardware, however, the former is a preferred implementation. Based upon such understanding, the technical solutions of the invention essentially or the part thereof contributing to the prior art can be embodied in the form of a computer program product which can be stored in a storage medium and which includes several instructions to cause a terminal device (which may be a mobile phone, a personal computer, a server, a network device, etc.) to perform the method according to the respective embodiments of the invention.

The foregoing disclosure is merely illustrative of the preferred embodiments of the invention, and it shall be noted that those ordinarily skilled in the art can further make several modifications and variations without departing from the principle of the invention and these modifications and variations shall also be regarded as coming into the claimed scope of the invention.

Those skilled in the art can appreciate that the modules in the apparatus of the embodiments can be distributed in the apparatus of the embodiments as described in the embodiments or located in one or more apparatuses different from that of the embodiments given corresponding variations. The modules of the foregoing embodiments can be integrated together or deployed separately; or they can be combined into one module or further divided into a plurality of sub-modules.

The embodiments of the invention have been numbered only for the sake of a convenient description but will not represent any superiority of one embodiment to another.

The foregoing disclosure is merely illustrative of several embodiments of the invention, but the invention will not be limited thereto, and any variations that can occur to those skilled in the art shall come into the scope of the invention.

The invention claimed is:

1. A method for displaying an application image, which is applicable in a device comprising a first operating system and a second operating system with the first operating system comprising a memory comprising a storage area assigned to an application of the second operating system and which comprises:

performing read and write operations, by the second operating system, in the storage area and transmitting a display request at the end of the operations to request a display process on the application image stored in the storage area;

receiving, by the first operating system, the display request from the second operating system and reading the application image stored in the storage area, wherein the first operating system is distinct from the second operating system;

judging, by the first operating system, whether a window manager is needed to process the application image according to the configuration of a local image display system, and if the window manager is needed, transmitting the application image to the window manager and transmitting the application image processed by the window manager to a display graphic library for processing; otherwise, transmitting the application image directly to the display graphic library for processing; and acquiring, by the first operating system, the location of a frame buffer through a display driver, transmitting the application image processed by the display graphic library to the frame buffer, and displaying the application image through the frame buffer.

2. The method according to claim 1, wherein performing the read and write operations by the second operating system in the storage area comprises:

receiving, by the second operating system, a User Interface, UI, update request from the application of the second operating system; and processing, by the second operating system, the application image in response to the UI update request.

3. The method according to claim 1, wherein transmitting by the second operating system the display request at the end of the operations comprises:

transmitting, by the second operating system, the display request in inter-process communication to request to perform UI update and display on the application image stored in the storage area.

4. The method according to claim 1, further comprising:

after displaying the application image through the frame buffer, returning, by the first operating system, a display success message to the second operating system to have the second operating system perform display operations on the next frame.

5. An apparatus for displaying an application image, which is applicable in a device comprising a first operating system and a second operating system, the second operating system being distinct from the first operating system, with the first operating system comprising a memory comprising a storage area assigned to an application of the second operating system and which comprises:

a running module configured to perform read and write operations in the storage area and transmit a display request to a proxy module at the end of the operations to request the proxy module for a display process on the application image stored in the storage area;

the proxy module configured to assign the storage area to the application of the second operating system in the memory of the first operating system after the application is run, receive the display request from the second operating system, read the application image stored in the storage area, and judge whether a window manager is needed to process the application image according to the configuration of a local image display system, and if the window manager is needed, transmit the application image to the window manager and transmit the application image processed by the window manager to a graphic processing module; otherwise, transmit the application image directly to the graphic processing module;

the graphic processing module configured to receive the application image from the proxy module and process the application image;

a display driver module configured to acquire the location of a frame buffer module and transmit the application image processed by the graphic processing module to the frame buffer module; and the frame buffer module configured to receive the application image from the display driver module and display the application image.

6. The apparatus according to claim 5, wherein:

the running module is further configured to receive a UI update request from the application of the second operating system, process the application image in response to the UI update request and instruct the proxy module in inter-process communication to perform UI update and display on the application image stored in the storage area.

7. The apparatus according to claim 5, wherein:

the proxy module is further configured to return a display success message to the running module to have the second operating system perform display operations on the next frame.

* * * * *